Nov. 23, 1943.  J. M. HOEFFELMAN  2,335,119
PROCESS FOR PRODUCING SULPHONIUM COMPOUNDS
Filed March 4, 1940
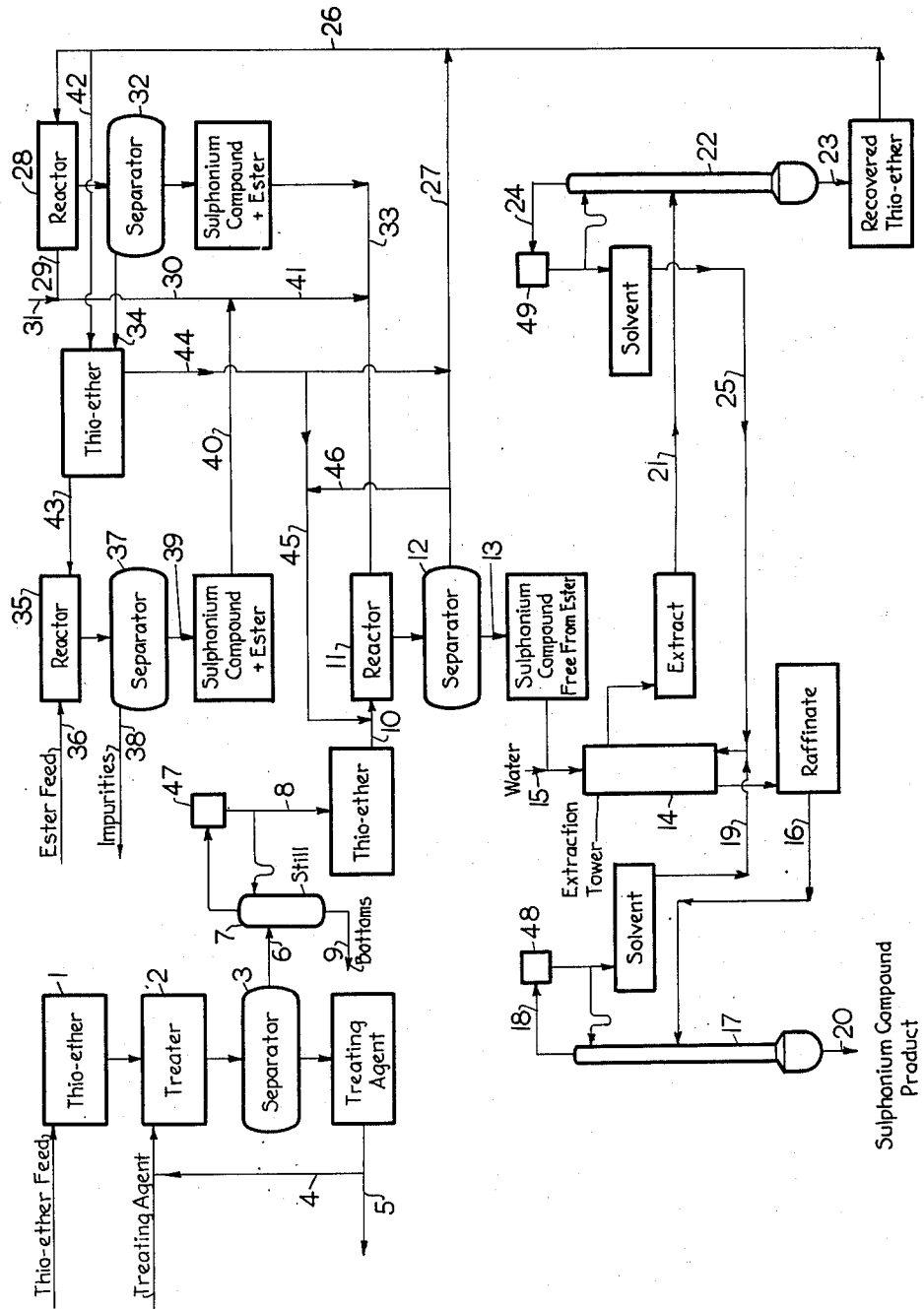
Inventor: Johan Marius Hoeffelman
By his Attorney: Millard L. Caldwell Patented Nov. 23, 1943

2,335,119

UNITED STATES PATENT OFFICE 2,335,119

PROCESS FOR PRODUCING SULPHONIUM COMPOUNDS

Johan Marius Hoeffelman, Amsterdam, Netherlands, assignor to Shell Development Company, San Francisco, Calif., a corporation of Delaware Application March 4, 1940, Serial No. 322,170 In the Netherlands March 28, 1939

13 Claims. (Cl. 260—458)

This invention relates to the manufacture of sulphonium compounds by reacting thio-ethers with suitable reagents and is especially concerned with the production of sulphonium compounds having surface active properties. It deals with an improved method for carrying out such reactions whereby improved yields of products of high quality may be obtained.

An important object of the invention is the provision of a process whereby more complete conversion of all starting materials to sulphonium compounds may be achieved. Another object is to utilize more efficiently mixtures of thio-ethers of varying reactivities in the production of sulphonium compounds. Still another object is to produce sulphonium compounds of higher purity particularly sulphonium compounds free from toxic components without increased cost. A further object is to improve the color of sulphonium compounds especially sulphonium compounds produced from thio-ethers derived from mineral oil or like sources. Among other objects is the provision of a cheap, efficient method for the separation of thio-ethers from sulphonium compound. Still other objects and advantages of the invention will appear to those skilled in the art from the following description taken with the accompanying drawing.

In the interest of conciseness and clarity the invention will be described in detail in connection with the production of sulphonium sulphates by reaction of mixtures of thio-ethers of varying reactivities derived from mineral oil with dialkyl sulphates, an application in which it has special advantages. It will be understood, however, that the invention is not limited to such reaction nor to such specific reactants as advantageous features of the invention may be applied not only to the reaction of thio-ether mixtures from other sources but also to the reaction of thio-ethers, whether used in admixture or not, with other sulphonium compound-producing reagents. Thus, for example, the same procedure may be applied to the production of sulphonium sulphonates or phosphates or halides or the like by reaction of suitable sulphonate, phosphate or halide esters instead of dialkyl sulphates. Still other variations in the process of the invention may be made as will be more fully pointed out hereinafter.

The possibility of producing sulphonium sulphates by reaction of dialkyl sulphates with thio-ethers has been demonstrated in the laboratory but larger scale production of such compounds has not been successful because of the poor quality and low yields obtained from commercially available starting materials. In particular, attempts to utilize technical thio-ethers have led to poor conversions which render the process impractically expensive. Efforts to overcome this difficulty by employing more drastic reaction conditions lead to impure, discolored products. The use of excess ester in order to promote more complete conversion of the thio-ethers is objectionable not only because the esters are themselves expensive so that their incomplete conversion increases the cost of the product but also because unreacted esters are difficult to remove from admixture with sulphonium compounds and constitute an especially undesirable impurity which is unstable and, particularly in the case of dimethyl sulphate and the like, is poisonous. Other difficulties which have been encountered in attempts to produce sulphonium compounds on a commercial scale include elimination of other impurities, particularly thio-ethers and color bodies, from the product. The present invention provides an efficient method for overcoming these difficulties and makes sulphonium compounds commercially available at a reasonable price for the first time.

Thio-ethers which may be used in the process include symmetrical and unsymmetrical, saturated and unsaturated, aliphatic, aromatic, aralkyl, alkaryl, alicyclic, heterocyclic and like thio-ethers which may or may not contain substituents such, for example, as halogen atoms or hydroxy or amino groups, etc. The thio-ethers may be obtained in any suitable way from any convenient source. Mineral oils, particularly petroleum products or suitable fractions, are an especially advantageous source of thio-ethers. United States Patents 2,051,807 and 2,052,268 describe methods of producing thio-ethers which are suitable for the preparation of starting materials for the present process. Alternatively the thio-ethers used may be prepared by reacting a mercaptan or mixture of mercaptans with one or more olefines. Olefinic fractions derived from cracked paraffin wax as described in U. S. Patent 2,172,228 are particularly suitable. Reaction of mercaptans with salts of sulphuric acid esters which may conveniently be prepared by processes such as are disclosed in U. S. Patents 2,139,393, 2,139,394 and 2,152,292, for example, or reaction of suitable organic halides, such, for example, as may be obtained as described in U. S. Patents 1,991,600, 2,077,382 and 2,130,084, with alkali sulphides may also be used for the preparation of the desired thio-ether. The thio-ethers themselves or the mercaptans from which they are derived may be obtained as by-products from the refining of mineral oils or mineral oil products, particularly cracking distillates. U. S. Patents 1,974,725, 2,059,075, 2,110,403 and 2,114,852 describe methods which are suitable for the recovery of mercaptans from petroleum hydrocarbons for use in preparing thio-ethers for the present invention.

The preferred thio-ethers are those obtained from mineral oil sources because of their availability at low cost. Such thio-ethers, even though having a good color themselves, may result in the production of dark-colored sulphonium compounds. Attempts to overcome this disadvantage by refining the starting materials from which the thio-ether is produced or the final product have not been successful. The nature of the coloring substances is not known but it has been found that treatment of the thio-ethers with an absorbent results in the production of sulphonium compounds of satisfactory color. Treatment with clay, fuller's earth, silica gel, bauxite, adsorptive carbon, sulphuric acid, phosphoric acid and the like has been found to be suitable. Particularly good results have been obtained with acid-treated bleaching earths such, for example, as various commercial terranas which are absorptive aluminum silicates prepared by treating natural silicates with hydrochloric acid to remove a large part of the foreign oxides and usually also a part of the alumina. With solid absorbents the best results have been obtained at elevated temperatures preferably of the order of about 100° to about 200° C. When using liquid inorganic acid such as concentrated sulphuric or phosphoric acid, preferably of at least 85% concentration, temperatures of about 0° to about 50° C. are satisfactory. The refining agents may be used singly or in combination, either in one or a plurality of stages. Sulphuric or phosphoric acids or mixtures of both deposited on a support such, for example, as silica gel may be used.

The treatment may be effected by stirring the thio-ethers with the selected refining agent followed by decantation and filtration if necessary. If desired the treated thio-ether may be washed, for example, with water before it is used in the sulphonium reaction. Other methods of contacting the thio-ether with the refining agent such as percolation of the thio-ether through a bed of absorbent clay or the like or, particularly in the case of lower-boiling thio-ethers, vapor phase contact may be carried out. A contact time of the order of about 2 to 20 minutes depending upon the nature of the refining agent chosen and the temperature employed is usually satisfactory. Thus with terrana at about 100° to 200° C. times of about 15 to 5 minutes give good results.

After such preferred preliminary treatment it is usually desirable to distill the thio-ether because of the darkening in color which takes place during this step in the process. The light-colored thio-ether fractions thus obtained are capable of producing sulphonium compounds of high purity and excellent color.

By way of illustrating the type of thio-ethers which are preferred for the process, an example of one method of preparing such thio-ethers will be given. As source of the thio-ethers a mixture of mercaptans obtained from the refining of a Dubbs cracked distillate was used. An analysis showed the mercaptans to have the following composition:

| | Per cent |
|---|---|
| Hydrocarbons | 0.4 |
| Methyl mercaptan | 14.7 |
| Ethyl mercaptan | 41.0 |
| Isopropyl mercaptan | 20.5 |
| Normal propyl mercaptan | 8.2 |
| Higher mercaptans | 13.4 |

The average molecular weight of the mercaptans was 69, corresponding to an average of 2½ carbon atoms per molecule. This mixture was reacted with an ester salt mixture obtained by sulphating a cracked distillate boiling between 160° and 320° C. obtained by vapor phase cracking of paraffin wax and neutralizing the product. The purified product containing 86.8% of sodium alkyl sulphates of 10 to 18 carbon atoms per molecule, having an average molecular weight of 301 corresponding to an average of 12.9 carbon atoms per molecule. Reaction in the presence of sodium hydroxide using 1.14 mols of mercaptan and 1.38 mols of sodium hydroxide per mol of ester salt at a temperature of about 120-140° C. in isopropyl alcohol solution gave a 72% yield of thio-ethers. The thio-ethers recovered after the usual purification by extraction and distillation in which the maximum topping temperature was 305° C. were light-colored products having, on the basis of an average molecular weight of 250, a purity of about 81 to 82%, the remainder being higher olefines and secondary alcohols. Narrower fractions may be used instead of the entire mixture and sulphuric acid or other suitable treatment for removal of olefines and alcohols may be applied before use. Similar results may be obtained by using primary alkyl sulphate salts such, for example, as sodium cetyl sulphate or the mixed salts obtainable by neutralizing the sulphated mixture of primary alcohols obtainable from cocoanut oil or the like, instead of the secondary alkyl sulphate salt mixture described.

Typical dialkyl sulphates which may be reacted with the thio-ethers so obtained include, for example, dimethyl sulphate, methyl ethyl sulphate, diethyl sulphate, methyl propyl and/or isopropyl sulphate, ethyl propyl and/or isopropyl sulphate, dipropyl sulphate, diisopropyl sulphate, propyl isopropyl sulphate, methyl isobutyl sulphate and higher homologues and isomers thereof. U. S. Patents 1,854,581, 1,948,891, 1,967,399 and 2,139,393 for example, describe methods for producing sulphates which may be used.

The thio-ethers and dialkyl sulphates may be reacted in any suitable apparatus, preferably apparatus which provides thorough mixing of the reactants at an elevated temperature preferably in the range of about 50° C. to 150° C. The reaction products are generally liquid when low-molecular thio-ethers or those having branched alkyl groups are used.

Prior methods of reaction do not give satisfactory yields of sulphonium sulphates however. When mixtures of thio-ethers and/or dialkyl sulphates are used, differences in the reactivities of the components result in unequal rates of conversion which further complicate the process. For example, with the previously described preferred thio-ethers the usual methods of reaction using stoichiometric proportions of reactants result in the conversion of only the more highly reactive of the thio-ethers with the result that not only are the less reactive thio-ethers lost but also the product is contaminated with unreacted starting materials. According to the present invention these difficulties are avoided by carrying out the reaction with an excess of thio-ether preferably under conditions at which substantially complete conversion of dialkyl sulphate is obtained. It has been found that the excess thio-ethers may be efficiently separated from the sulphonium sulphate thus formed by treatment with suitable solvents such as hydrocarbons and ethers and the like. The thus recovered thio-ethers may then be reacted with more dialkyl sulphate, preferably using a molecular excess of ester, under the same or different temperature conditions. The ester-containing sulphonium sulphate mixture obtained is difficult to separate but further reaction with thio-ether, preferably an excess of fresh thio-ether mixture, makes it possible to substantially convert the ester content and obtain, after separation of unreacted thio-ethers which may be re-used in the process, sulphonium sulphates of high purity in excellent yields. When using a mixture of thio-ethers of different reactivities it is preferred to carry out the reaction using the esters in excess in the conversion of thio-ethers which have already been used in the reaction, most preferably the less reactive thio-ethers remaining after reaction of an excess of thio-ethers with ester-containing sulphonium sulphate are used.

If E represents the esters, T the thio-ethers, ET the sulphonium compounds and A the components which do not react under the operating conditions including thio-ethers, if any, and impurities, then the reactions may be illustrated by the following equations:

(ET+E)+2(T+A)→2ET+(T+2A)
(T+2A)+2E→(ET+E)+2A
(ET+E)+2(T+A)→2ET+(T+2A)

etc. In this way both the reactive and less reactive thio-ethers and the esters are utilized as efficiently as possible. Accumulation of materials which are non-reactive under the operating conditions may be avoided by withdrawal of the products represented by 2A.

As illustrative of the variations which may be made in this method of reaction, it is possible to divide the thio-ether mixture recovered from a reaction wherein the fresh thio-ethers are employed and employ, say one-third, for reaction with the ester feed while using the remainder together with a fresh portion of thio-ether mixture for conversion of esters present in admixture with sulphonium sulphates. Such a procedure may be represented by the following scheme:

(ET+E)+2(T+A)→2ET+(T+2A)
⅓(T+2A)+2E→(⅓ET+5/3E)+⅔A
⅔(T+2A)+2(T+A)+(⅓ET+5/3E)→
2ET+(T+10/3A)

etc.

By this variation a higher ratio of ester to thio-ether may be maintained in the second reaction stage and consequently more complete conversion of the less reactive thio-ethers may be achieved without prolonging the reaction time or increasing the temperature. Withdrawal from the system of the material represented by ⅔A involves less danger of including valuable unreacted thio-ether. While the quantity of material thus withdrawn is shown as being smaller than that represented by 2A in the first described procedure, so that more non-reactive and slightly reactive compounds remain in circulation in the process, this accumulation soon reaches a maximum and an equilibrium becomes established due to the fact that the quantity of withdrawn material increases as the process is continued.

Still other variations may be made in the process which may be carried out batchwise, intermittently or continuously preferably using countercurrent methods of flow. Whatever the specific procedure adopted it will be found that the method of the invention has the advantage of permitting substantially complete conversion of both dialkyl sulphates and thio-ethers even though these reactants are used in equivalent amounts only. In fact yields of sulphonium sulphate of practically 100% of the theoretical based on the dialkyl sulphate may be obtained when using starting material free from higher alcohols which tend to react with the dialkyl sulphates with formation of alkylation products and employing low reaction temperatures. The yield based on thio-ether used is also higher than is obtained by prior methods even when mixtures of thio-ethers of different reactivities are used because the thio-ethers are reacted under conditions especially adapted to correspond with the nature of the thio-ethers involved. Furthermore the color and purity of the product are superior to those formerly obtained from analogous starting material not only because contamination by unreacted starting materials is avoided and inclusion of color forming impurities is eliminated by the novel initial step of treating the thio-ether with a suitable absorbent agent but also because the procedure of carrying out the reaction in the presence of an excess of one of the reactants permits lower temperatures to be used which prevent decomposition of dialkyl sulphates and gives lighter colored sulphonium sulphates. In one typical instance, for example, it was found that the process of the invention could be very successfully effected at about 65° to 70° C. whereas reaction of the same reactants in equivalent proportions as in prior procedures required a temperature of at least 100° C. in order to obtain a comparable conversion. Another advantage of the invention is that it facilitates temperature regulation since control of the exothermic heat of the reaction is materially aided by the presence of an excess of one of the reactants.

The accompanying drawing which is a flow sheet or diagrammatic representation illustrating the steps of the process in one of its preferred modifications will make the invention more clear. The thio-ether mixture from a storage tank 1 is fed to a treating vessel 2 where it is intimately contacted with one of the previously described treating agents, for example with about 5% by weight of Terrana at 150° C. After about 15 to 30 minutes contact the treating agent is separated, if necessary after first cooling by means not shown. The separator 3 may be a centrifuge or in the case of solid treating agents which are dispersed in the liquid thio-ethers a filter or may be a decantation vessel where sulphuric acid or the like is used for the treatment or may be omitted altogether where treatment in vessel 2 is by percolation through a suitable mass of treating agent which is not carried out with the treated thio-ether. Line 4 represents return of incompletely spent treating agent to the process while withdrawal of used treating agent is represented by line 5. The treated thio-ether is conducted by line 6 to still 7 where light-colored thio-ethers are separated as overhead products from discolored bottoms which may be withdrawn by line 9. Further fractionation of the thio-ethers, not shown, may be carried out at this stage if desired. The overhead products taken off are condensed in condenser 47 and conducted by lines 8 and 10 to reactor 11 which may be an autoclave or pipe coil or other suitable device for effecting intimate contact of reactants in the liquid phase under controlled temperature conditions. A particularly advantageous type of reactor which may be used is described in copending U. S. application Serial No. 276,251, filed May 27, 1939, now U. S. Patent 2,232,674. In reactor 11 the thio-ether is contacted with the dialkyl sulphate or mixture of dialkyl sulphates being used in the process. In normal operation this dialkyl sulphate will preferably contain admixed sulphonium sulphate as will be more fully described hereinafter. When starting up the system or using suitable modifications of the present system, however, fresh dialkyd sulphate may be used. In any case a substantial stoichiometric excess, preferably at least 2 mols of thio-ether per mole of dialkyl sulphate are contacted in reactor 11 at a temperature preferably of the order of about 70° to 80° C. After allowing preferably about ¼ to 2 hours average contact time for completion of the reaction the liquid reaction mixture is allowed to stratify in separator 12 and a lower layer of sulphonium sulphates free from dimethyl sulphate but containing thio-ethers is withdrawn via line 13 and conducted to an extraction unit 14.

While a tower type or other suitable extractor in which the sulphonium compound may be contacted in countercurrent with a suitable selective solvent for thio-ethers is preferred, the extraction may be effected in other types of apparatus, whether operated batchwise or continuously. As suitable selective solvents for thio-ethers, hydrocarbons or ethers in which the sulphonium compounds involved are insoluble may be used. The solvent or solvent mixture used should preferably be one which is readily separated from the thio-ethers by distillation. Lower boiling hydrocarbons such as butane, pentane, hexane, isobutane, cyclohexane, benzene, lower boiling fractions of gasoline, the amylenes and the like or lower boiling ethers as di-ethyl ether, methyl propyl ether, di-isopropyl ethers, etc. The extraction may be effected at ordinary or elevated temperatures using atmospheric or reduced or superatmospheric pressures. Treatment at elevated temperatures of from about 30° to about 70° C. under sufficient pressure to maintain the materials in the liquid phase is often advantageous as the viscosity of the mixture is thereby reduced and the purification of the sulphonium compound is made more complete and rapid. If desired, water or aqueous alcohol may be added to the sulphonium compound as by line 15 prior to effecting the extraction in order to increase the sharpness of the separation and reduce the amount of solvent dissolved in the raffinate. Alternatively, the extract phase may be water washed and the wash water thus obtained supplied by line 15 or some other arrangement for effecting the extraction in countercurrent with two mutually immiscible solvents, one of which is a preferential solvent for the sulphonium compound or compounds being purified and the other of which solvents is one of the previously described preferred hydrocarbons and/or ethers. It is a feature of the invention that this improved method of separating thio-ethers from sulphonium compounds may be applied not only to sulphonium compounds produced as herein described but also to other similar mixtures regardless of their source or composition.

After extraction the raffinate is conducted via line 16 to still 17 where any solvent present therein is removed as overhead product by line 18 condensed in condenser 48 and returned to the system by line 19. Sulphonium sulphate free from thio-ethers and perfectly soluble in water without turbidity is withdrawn as bottom product by line 20. This product has a light color in contrast to sulphonium sulphates prepared in a similar manner except for the treatment in treater 2. Furthermore this product of the present process has unusual wetting and emulsifying properties. It may be desirable to neutralize the product prior to use.

The extract phase from extractor 14 is conducted by line 21 to still 22 where unreacted thio-ether is separated as bottom product by line 23 from the solvent taken off overhead by line 24 condensed in condenser 49 and returned to the system by line 25 for mixing with the solvent recovered from the product and reuse for further extraction. The thus recovered thio-ether is admixed in line 26 with thio-ether separated as upper layer from separator 12 and introduced by line 27. This thio-ether mixture of mainly less reactive thio-ethers is fed to reactor 28 where it is reacted with dimethyl sulphate introduced by line 29. The dimethyl sulphate may be present in admixture with sulphonium sulphate produced in another stage of the process with or without additional dimethyl sulphate introduced by line 31 or may be fresh dimethyl sulphate from the latter source alone. In any case the reaction may be conducted as previously described or if desirable, a somewhat higher temperature, preferably of the order of about 10° to 20° C. higher than that used with the fresh thio-ether mixture. After reaction the mixture may be stratified in separator 32 and the separated sulphonium sulphate layer containing the excess unreacted dimethyl sulphate conducted by line 33 to reactor 11 while the thio-ether layer removed by line 34 is supplied to reactor 35 by line 43. In reactor 35 the thio-ether layer containing principally non-reactive compounds and the least reactive of the thio-ethers is reacted with an excess of dimethyl sulphate introduced via line 36. Preferably the amount of dimethyl sulphate used is that stoichiometrically required for conversion of the thio-ether feed being supplied via line 10 minus any dimethyl sulphate admitted by line 31. The reaction in reactor 35 may be conducted under the same conditions as are used in reactor 28 and/or 11 or may be at a higher temperature and/or for a longer time. The reaction products are separated by decantation in separator 37, the upper layer of substantially non-reactive materials being withdrawn from the system by line 38 while the lower layer of dimethyl sulphate containing sulphonium sulphate formed in reactor 35 is conducted by lines 39, 40, 30 and 29 to reactor 28 for further reaction of the dimethyl sulphate as previously described.

It is possible to carry out the reaction without using reactor 28 in which case the lower layer from separator 37 is conducted by lines 39, 40, 41 and 33 for reaction in reactor 11 while the thio-ether mixture in line 26 is conducted by lines 42 and 43 to reactor 35. Another variation is to divide the thio-ethers recovered from separator 32 and feed only a part to reactor 35 by line 43 while the remainder is returned to reactor 28 by lines 44, 27 and 26, or to reactor 11 by lines 44, 45, and 10. Alternatively thio-ether layer from separator 32 may be reacted in all three of the reactors. It may be advantageous, particularly when line 45 is not used for conducting thio-ether layer from line 44 to line 10 to return a part of the thio-ether layer from separator 12 to reactor 11 as by lines 46, 45 and 10.

The following examples illustrate some of the advantages of the process of the invention.

Example I

Using the previously described thio-ether mixture and dimethyl sulphate as starting materials, sulphonium sulphates were prepared by reaction according to the system shown in the drawing. The thio-ether was treated with 5% by weight of Terrana for ½ hour at 150° C. and topping to 305° C. The reaction in all stages was carried out at 70° C. or slightly lower. The extraction for separation of thio-ether from sulphonium sulphate was effected with pentane and was carried out in three stages. Solvent was removed from the product by evaporation under vacuum.

From 24.08 kilograms of thio-ether of 82% purity (79 mols) and 10.53 kilograms of dimethyl sulphate (83½ mols the slight excess being used because of the presence of alcohols in the thio-ether) were obtained 28.37 kilograms of sulphonium sulphate corresponding to 69½ mols of pure product. The yield of neutral sulphonium sulphate based on converted thio-ether was 91% and based on converted dimethyl sulphate was 82½%. The product was of excellent color whereas similar reaction without Terrana treatment gave a brown-black product.

Example II

A mixture of thio-ethers obtained by reacting sodium alkyl sulphates derived from cracked wax olefines boiling between 160° and 320° C. and a mercaptan mixture from Dubbs cracked sulphur-containing crude oil, which thio-ethers had a sulphur content of 10.4% corresponding to 80% of thio-ethers and 20% of higher molecular olefines and alcohols was reacted with dimethyl sulphate.

At the start of the reaction 1.26 kilograms of dimethyl sulphate and 5.80 kilograms of thio-ether mixture were stirred for 2 hours at 70° C. After a quarter of an hour standing the reaction product completely separated into two layers. The lower layer consisted of sulphonium compounds free from dimethyl sulphate, but containing thio-ethers. This lower layer was extracted with gasoline, and, after removal of the gasoline from the raffinate, 3.32 kg. of purified sulphonium compounds were obtained. The gasoline was likewise removed from the extract, after which the residue was added to the upper layer. The thio-ether mixture thus obtained weighed 3.70 kg. This quantity was stirred for 2 hours at 70° C. with 2.52 kg. dimethyl sulphate, whereupon a separation into layers was again caused to take place. The upper layer thus obtained (1.83 kg.) with a sulphur content of 3.20% by weight was discarded as waste product. The lower layer (4.30 kg.) contained sulphonium compounds and dimethyl sulphate. It was stirred for 2 hours at 70° C. with 5.80 kg. fresh thio-ether mixture. After separation into layers the non-converted thio-ethers were removed from the lower layer by extraction with gasoline, etc., 6.52 kg. purified sulphonium compounds being thus obtained. The thio-ethers removed from the lower layer were added to the upper layer, whereupon this mixture (3.42 kg.) was caused to react with 2.52 kg. dimethyl sulphate, as before. The product was free from dimethyl sulphate and perfectly soluble in water without turbidity.

Example III

To show the efficiency of the method of the invention in separating thio-ethers from sulphonium compounds 3.95 kilograms of lower layer obtained by reacting 1.26 kilograms of dimethyl sulphate with 4.60 kilograms of secondary dodecyl ethyl sulphide at 70° C. for 2 hours of intensive stirring was used. Extraction with pentane using one kilogram for the first extraction and half a kilogram for the two succeeding extractions gave after evaporation of residual pentane from the raffinate 3.16 kilograms of sulphonium sulphate free from thio-ether. From the extract 0.72 kilogram of thio-ethers was recovered by evaporation of the pentane.

While the application of the invention to the manufacture of sulphonium sulphates has been emphasized in the foregoing discussion it is to be understood that this implies no limitation on the invention as equally good results may be obtained in the production of other sulphonium compounds by substituting other sulphonium-forming compounds for the dialkyl sulphates described. Thus, for example, sulphonium sulphonates may be produced by using sulphonic esters such as methyl benzene sulphonate, methyl toluene sulphonate, methyl naphthalene sulphonate, methyl esters of tertiary butyl benzene sulphonic acid and/or octyl or dodecyl benzene sulphonic acids, ethyl benzene sulphonate, propyl benzene sulphonate or the corresponding ethyl sulphonic acid ester and the like. Instead of sulphonic esters suitable halide or phosphate esters may be employed. The advantages of the process may also be realized by carrying out the reaction with thio-ethers, an alcohol and sulphuric and/or sulphonic acid as described in copending applications, Serial No. 218,632, filed July 11, 1938, and Serial No. 220,130, filed July 19, 1938.

The process offers many advantages and is capable of widely different applications. Thus not only may it be used for obtaining increased yields of mixtures of sulphonium compounds from mixtures of thio-ethers of different reactivities but also it may be employed to produce individual sulphonium compounds or mixtures of more uniform characteristics by separating the products of selective reaction of reactants of similar reactivity prior to further reaction of remaining unreacted components. This may be accomplished for example by modifying the procedure illustrated in the drawing so as to carry out the reaction in reactor 28 with an excess of residual thio-ethers compared with the amount of dialkyl sulphate present so that the product preferably comprises sulphonium sulphates of the less reactive thio-ethers plus unreacted thio-ethers. The lower layer of the stratified mixture in such a case is extracted in the same manner as, but separately from, the sulphonium sulphate layer from separator 12 so as to separately recover this different product. The dialkyl sulphate feed for reactor 11 is taken from the fresh supply. This procedure is particularly useful for the separation of thio-ethers which are not easily segregated by distillation. For example, thio-ethers having the sulphur atom not more than twice removed from the end of the chain may be removed from isomeric thio-ethers in which the sulphur atom is further removed from the end of the chain by selective reaction of the former with a suitable sulphate or sulphonic ester according to the process of the present invention. Where it is the thio-ether containing the smaller hydrocarbon group attached to the sulphur atom which is the desired product, the separation may be made in the same way and the desired thio-ether recovered by regeneration from the sulphonium compound preferably under conditions at which the sulphate or sulphonic ester is recovered for reuse in the process.

Another advantageous use to which the process of the invention may be applied is in the purification of thio-ethers which are contaminated by undesired esters. According to the invention such ester impurities may be removed by selective conversion to sulphonium compounds by treating the mixture with more reactive thio-ethers.

While the invention has been described in detail and specific examples illustrating some of the possible modes of operation and some of the various types of starting materials which may be used and products obtainable have been given, it is to be understood that the invention is not limited thereto nor by any theory proposed in explanation of the improved results achieved since other variations, such, for example, as carrying out in a suitable unitary reactor steps shown as being effected in separate units, may be made without departing from the invention which is limited only by the appended claims, wherein the expressions, an inorganic ester capable of forming a sulphonium compound therewith, and the like, are intended to include mixtures of a suitable inorganic acid and alcohol as well as the preformed esters.

I claim as my invention:

1. In a process of producing a sulphonium sulphate by reaction of a mixture of aliphatic unsymmetrical thio-ethers of different reactivities having attached to the sulphur atom an alkyl group of at least 10 carbon atoms in a straight chain and an alkyl group of not more than 4 carbon atoms with a dialkyl sulphate the method of increasing the conversion of said reactants and the yield and quality of the sulphonium sulphate obtained therefrom which comprises treating said thio-ether mixture with between 2 and about 10% by weight of terrana at 100° to 200° C. for 10 to 60 minutes, separating the more highly colored fractions of the resulting product, contacting a stoichiometric excess of the thus treated thio-ether with said dialkyl sulphate under conditions at which said sulphonium sulphate is formed, stratifying the resulting mixture into an unreacted thio-ether layer and a sulphonium sulphate layer, extracting the latter with a lower boiling hydrocarbon solvent for said thio-ether, reacting thio-ether thus recovered together with thio-ether from said thio-ether layer with a stoichiometric excess of said dialkyl sulphate and reacting the resulting mixture of said dialkyl sulphate and sulphonium sulphate with thio-ether.

2. In a process of producing a sulphonium sulphate by reacting an aliphatic thio-ether having at least one alkyl group of less than five carbon atoms attached to the sulphur atom with a mixture of an aliphatic monohydric alcohol and sulphuric acid capable of forming a sulphonium sulphate therewith the method of increasing the conversion and quality of the product which comprises reacting a substantial stoichiometric excess of said thio-ether with said alcohol-sulphuric acid mixture, separating unreacted thio-ether from the reacted mixture and reacting thus recovered thio-ether with a substantial stoichiometric excess of said alcohol-sulphuric acid mixture.

3. In a process of producing a sulphonium sulphate by reacting an aliphatic thio-ether with a neutral sulphate ester capable of forming a sulphonium sulphate therewith the method of increasing the conversion and quality of the product which comprises reacting a substantial stoichiometric excess of said thio-ether with said neutral sulphate ester, separating unreacted thio-ether from the reacted mixture and reacting thus recovered thio-ether with a substantial stoichiometric excess of neutral sulphate ester.

4. In a process of producing a sulphonium sulphonate by reacting an aliphatic thio-ether having at least one alkyl group of less than five carbon atoms attached to the sulphur atom with a sulphonic acid ester capable of forming a sulphonium sulphonate therewith the method of increasing the conversion and quality of the product which comprises reacting a substantial stoichiometric excess of said thio-ether with said sulphonic acid ester, separating unreacted thio-ether from the reacted mixture and reacting thus recovered thio-ether with a substantial stoichiometric excess of said sulphonic acid ester.

5. In a process of producing a sulphonium compound by reaction of a mixture of thio-ethers of different reactivities with an inorganic ester capable of forming a sulphonium compound therewith the method of improving the conversion and quality of the product which comprises carrying out said reaction with a substantial stoichiometric excess of thio-ether to said ester, separating unreacted thio-ether from the sulphonium compound present in the reacted mixture and reacting separated thio-ether with an excess of said ester.

6. The process of claim 5 wherein unreacted thio-ether is separated from the said sulphonium compound by extraction with a solvent in which said sulphonium compound is substantially insoluble under the extraction conditions.

7. In a process of producing a sulphonium compound from a mixture of thio-ethers of substantially different reactivities and an inorganic ester capable of forming sulphonium compounds therewith the method of increasing the conversion and quality of the products which comprises intimately mixing a substantial stoichiometric excess of thio-ether with said ester under conditions at which said sulphonium compound is formed, separating unreacted thio-ether from the sulphonium compound, reacting the separated thio-ether with an amount of said ester stoichiometrically equivalent to the thio-ether used as initial feed and reacting the ester content of the resulting ester-containing sulphonium compound with said stoichiometric excess of thio-ether.

8. In a process of producing a sulphonium compound from a mixture of thio-ethers of substantially different reactivities and an inorganic ester capable of forming sulphonium compounds therewith the method of increasing the conversion and quality of the products which comprises selectively reacting the more reactive of said thio-ethers with said ester and subsequently contacting remaining unreacted thio-ether with a substantial stoichiometric excess of said ester under conditions at which conversion of less reactive thio-ether to said sulphonium compound takes place.

9. In a process of producing a sulphonium compound by reaction of a light-colored mixture of thio-ethers with an inorganic ester capable of forming a sulphonium compound therewith the method of improving the conversion and quality of the product which comprises removing from said thio-ether mixture compounds which impart color to the sulphonium compound in said reaction by treatment with an absorbent prior to carrying out said reaction with a stoichiometric excess of said treated ether to said ester.

10. In a process of producing a sulphonium compound by reaction of a light-colored mixture of thio-ethers with an inorganic ester capable of forming a sulphonium compound therewith the method of improving the quality of the product which comprises removing from said thio-ether mixture compounds which impart color to the sulphonium compound in said reaction by treatment with an absorbent clay prior to carrying out said reaction.

11. The process of claim 10 wherein the thio-ether mixture is treated with terrana at 100° to 200° C. and the treated mixture is distilled prior to reaction with the inorganic ester.

12. The process of claim 9 wherein the thio-ether mixture is treated with a concentrated strong polybasic inorganic acid at about 0° to 50° C. prior to the reaction.

13. A process of producing a sulphonium compound which comprises reacting a stoichiometric excess of thio-ether with an inorganic ester capable of forming a sulphonium compound therewith, adding water, extracting the aqueous reaction mixture containing thio-ether and the sulphonium compound obtained, in the liquid phase with a lower boiling hydrocarbon for said thio-ether at a temperature of 30° to 70° C. under a pressure at which all components are substantially in the liquid phase and recovering the sulphonium compound and separated thio-ether.

JOHAN MARIUS HOEFFELMAN.